United States Patent
Burdick et al.

(10) Patent No.: US 7,225,412 B2
(45) Date of Patent: May 29, 2007

(54) VISUALIZATION TOOLKIT FOR DATA CLEANSING APPLICATIONS

(75) Inventors: Douglas R. Burdick, Ithaca, NY (US); Robert J. Szczerba, Endicott, NY (US); Wei Kang Zhan, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 732 days.

(21) Appl. No.: 10/308,529

(22) Filed: Dec. 3, 2002

(65) Prior Publication Data

US 2004/0104925 A1 Jun. 3, 2004

(51) Int. Cl.
*G06F 3/00* (2006.01)

(52) U.S. Cl. .................. 715/764; 715/854; 715/968

(58) Field of Classification Search ............... 715/764, 715/854, 968; 707/3, 6
See application file for complete search history.

(56) References Cited

U.S. PATENT DOCUMENTS 5,819,291 A   10/1998   Haimowitz et al.
5,995,097 A   11/1999   Tokumine et al.
6,182,070 B1  1/2001    Megiddo et al.
6,216,134 B1  4/2001    Heckerman et al.
6,321,225 B1  11/2001   Heckerman et al.
6,496,832 B2  12/2002   Chi et al.
6,708,166 B1* 3/2004    Dysart et al. .................. 707/6
2003/0204518 A1* 10/2003   Lang et al. .................. 707/101
2005/0235030 A1* 10/2005   Lauckhart et al. .......... 709/200

OTHER PUBLICATIONS

"MetaRecon Integrating Enterprise Data Management", White Paper: Metagenix, Inc. 2000.

* cited by examiner

*Primary Examiner*—Sy D. Luu
(74) *Attorney, Agent, or Firm*—Tarolli, Sundheim, Covell & Tummino LLP

(57) ABSTRACT

A system views results of a data cleansing application. The system includes a results visualization module and a learning visualization interface module. The results visualization module organizes output of the data cleansing application into a predefined format. The results visualization module displays the output to a user. The learning visualization interface module facilitates interaction with the data cleansing application by the user.

12 Claims, 9 Drawing Sheets

| Problem | Dirty Data | Comments | Standardization/ Validation/ Correction can handle? |
|---|---|---|---|
| Missing value | Phone = 999-999999 | Unavailable entries during data entry (dummy values or null) | Maybe |
| Misspellings- Phonetic | Name ="Zerba" (should be 'Szczerba') | Usually results in very different strings. | No |
| Misspellings - Typographical | City="Oowego" City="Owgo" | Can be either insertion, deletion, transposition, or substitution of characters. Strings are still very similar. | Depends, If results in valid value, NO If results in non-sense, Yes |
| Wrong Word Order | partName1 = "Hammer No. 10" partName2 = "No. 10 Hammer" | Switch entire substring values - may be handled by standardization | Probably YES |
| Cryptic values, Unique Abbreviations | Occupation="DB Prog." Experience="B" | ad-hoc, proprietary standard. Usually not documented anywhere. | NO, if not documented |
| Common Abbreviations | St. for Street, Dr. for Doctor, etc. | These are widely accepted and used by many people. | YES |
| Acronym/Initials | PSU for Penn State Univ. D. B. for Doug Burdick | These are widely accepted acronyms ONLY | Acronyms, YES (if table) Initials, NO |
| Embedded Values | Name="J. Smith 12/2/70 New York" | Multiple values entered in for one attribute (in a free-form field) | YES |
| Misfielded values | City="United States" | No city by that name | YES |
| Violated attribute dependancies | City="Owego" Zip="14850" | City and zip code should | YES |
| Field (Word) Transpositions | Name1 = "J. Smith" Name2 = "Smith J." | Usually happens in free-form | YES -if identifiable |
| Duplicated Records | Emp1=(name="John Smith"...): Emp2=(name="J. Smith"...) | Same employee represented twice due to data entry errors | ABSOLUTELY NOT |
| Contradicting Records | Emp1=(name="John Smith" bdate="12/2/70") Emp2=(name="John Smith" bdate="12/12/70") | Same real-world entity described by two different values | NO |
| Wrong References | emp=(name="Doug Burdick", deptno=L49) | Referenced department (L49) is defined but wrong (should be L48) | NO |

Fig.1

```
Doctor Jim G. Taylor
5800 W. Elgin St.
Pittsburg, PA 15206
```
⇒
```
Pre-Name: Doctor
First Name: Jim
Middle Name:    G.
Last Name: Taylor
St. Range:    5800
Pre-Direction:    W.
Street Name:    Elgin
Suffix:    St.
City:    Pittsburg
State:    PA
Zip:    15206
```

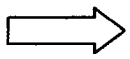

```
Pre-Name: Doctor
First Name: Jim
Middle Name:    G.
Last Name: Taylor
St. Range: 5800
Pre-Direction:    W.
Street Name:    Elgin
Suffix:    St.
City:    Pittsburg
State:    PA
Zip:    15206
```
⇒
```
Pre-Name: Doctor
First Name: Jim
Middle Name:    G.
Last Name: Taylor
St. Range: 5800
Pre-Direction:    E.
Street Name:    Elgin
Suffix:    St.
City:    Pittsburgh
State:    PA
Zip:    15206-2331
```

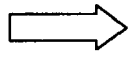

```
Pre-Name:    Doctor
First Name:    Jim
Middle Name:    G.
Last Name: Taylor
St. Range:    5800
Pre-Direction:    E.
Street Name:    Elgin
Suffix:    St.
City:    Pittsburgh
State:    PA
Zip:    15206
```
⇒
```
Pre-Name:    Dr.
First Name:    James
Middle Name:    G.
Last Name: Taylor
St. Range:    5800
Pre-Direction:    East
Street Name:    Elgin
Suffix:    Street
City:    Pittsburgh
State:    Pennsylvania
Zip:    15206-2331
```

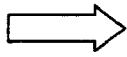

VISUALIZATION TOOLKIT FOR DATA CLEANSING APPLICATIONS

FIELD OF THE INVENTION

The present invention relates to a system for cleansing data, and more particularly, to a system for visualizing a data cleansing application.

BACKGROUND OF THE INVENTION

In today's information age, data is the lifeblood of any company, large or small; federal, commercial, or industrial. Data is gathered from a variety of different sources in various formats, or conventions. Examples of data sources may be: customer mailing lists, call-center records, sales databases, etc. Each record from these data sources contains different pieces of information (in different formats) about the same entities (customers in the example case). Each record from these sources is either stored separately or integrated together to form a single repository (i.e., a data warehouse or a data mart). Storing this data and/or integrating it into a single source, such as a data warehouse, increases opportunities to use the burgeoning number of data-dependent tools and applications in such areas as data mining, decision support systems, enterprise resource planning (ERP), customer relationship management (CRM), etc.

The old adage "garbage in, garbage out" is directly applicable to this environment. The quality of the analysis performed by these tools suffers dramatically if the data analyzed contains redundant values, incorrect values, or inconsistent values. This "dirty" data may be the result of a number of different factors including, but certainly not limited to, the following, as illustrated in FIG. 1: spelling errors (phonetic and typographical), missing data, formatting problems (incorrect field), inconsistent field values (both sensible and non-sensible), out of range values, synonyms, and/or abbreviations. Because of these errors, multiple database records may inadvertently be created in a single data source relating to the same entity or records may be created which don't seem to relate to any entity. These problems are aggravated when the data from multiple database systems is merged, as in building data warehouses and/or data marts. Properly combining records from different formats becomes an additional issue here. Before the data can be intelligently and efficiently used, the dirty data needs to be put into "good form" by cleansing it and removing these mistakes.

Thus, data cleansing necessarily involves the identifying of similarities between fields in different records. The simplest approach for determining which records have "similar" values for a particular field would be to define only identical values to be "similar". If two records have the same value for the field, they would be considered to have similar values. Otherwise, they would not. This approach is very prone to "noise," or errors present in the data causing differences between records describing the same object (i.e., causes records to have different values for the field).

Usually, the cleansing application output is evaluated by a human expert tracing through the result from the execution of the application on a given sample data set (where the correct answer is known). This interactivity is infeasible for all but the smallest record sets.

Conventional systems for visualizing and interfacing with the cleansing process are limited to only displaying information and do not allow user input. In most cases, only the cleansed result and some rudimentary statistics about it are presented in a report after the cleansing application is complete. Examples of reported statistics include the number of records in the result, the average size of duplicate record sets, and number of mistaken values the application has corrected. The report may also include a listing of anomalies or "special cases" encountered during processing requiring further investigation. Online human interaction with learning systems for data cleansing is not supported by conventional application interfaces.

SUMMARY OF THE INVENTION

A visualization system in accordance with the present invention provides an online human user interface to the processing of the cleansing process. The user may interactively "navigate" the cleansing process to "drill down" into the interesting portions of the cleansing process for further analysis. Interesting portions of the cleansing process may be annotated, with the user determining what is "interesting".

The visualization system may present relevant information about the process in a consolidated format, bringing information about each of the intermediate steps together to provide a high-level idea of what the cleansing process looks like. Users may create "what if" scenarios by running the cleansing application with different parameters to see how results change. The interactivity with the learning system allows a user to provide direct, educated feedback to the learning components.

The visualization system further provides an interactive human user interface for a data cleansing application. The interface organizes the cleansed results for presentation to the user in a graphical format. Information from the separate intermediate steps of the cleansing process is brought together and presented in a consolidated, hierarchical form, allowing the user to receive a general overview of the results comprehensively and quickly. Interesting portions of the results may be annotated by the system, and the user may examine these in detail by expanding the relevant results. The interface supports user editing of any results and entering information, as appropriate. This allows a user to interactively provide feedback to the cleansing application. The interface also has components for helping a user visualize the operation of, and interact with, a learning system that may be included with the cleansing application to optimize future program performance.

BRIEF DESCRIPTION OF THE DRAWINGS

The foregoing and other advantages and features of the present invention will become readily apparent from the following description as taken in conjunction with the accompanying drawings, wherein:

FIG. 1 is a schematic representation of the performance of a part of an example system for use with the present invention;

FIG. 2 is a schematic representation of one example part of a system for use with the present invention;

FIG. 3 is a schematic representation of another example part of a system for use with the present invention;

FIG. 4 is a schematic representation of still another example part of a system for use with the present invention;

DETAILED DESCRIPTION OF AN EXAMPLE EMBODIMENT

A visualization system in accordance with the present invention provides an online human user interface to the processing of the cleansing application. The user may interactively "navigate" the cleansing application to "drill down" into the interesting portions of the cleansing application for further analysis. Interesting portions of the cleansing application may be annotated, with the user determining what is "interesting".

Generally, a cleansing application will be separated into modules, with each module responsible for performing one of six steps. The modules performing each of these steps may also have an associated learning component. Each learning component refines the execution of its associated module to improve the result of that step thereby improving the overall cleansing application. The refining performed by the learning module is based on information generated from the record collection (i.e., statistics about record collection) and/or information external to the record collection (i.e., feedback provided by a human user).

An example data cleansing application 800 may include a learning module for each step of a data cleansing process. Each learning module 801-806 takes information about the record collection as input, and outputs suggestions for improving the cleansing application. These suggestions are communicated to the modules 801-806 performing the corresponding step of the cleansing process. There are numerous ways to implement these learning modules.

An example data cleansing system for use with the present invention identifies groups of records that have "similar" values in different records for the same field. "Similar" means that all of the records in the field set would have the same value if the data were free of errors and standardized. The example system may be robust to "noise" present in real-world data (despite best attempts at standardization, normalization, and correction). The example system may involve the application of sets of transform functions to the fields in each of the records. Additionally, the example system may create a data structure to store the similarity information of the associated records for each field.

Figure 6:
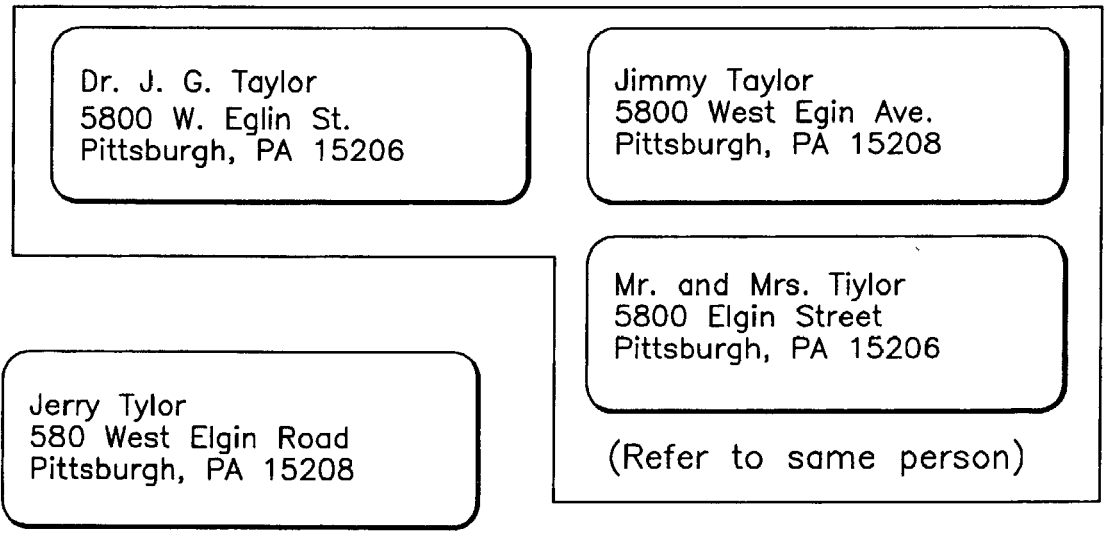
FIG. 6 is a schematic representation of still another example part of a system for use with the present invention.
Figure 7:
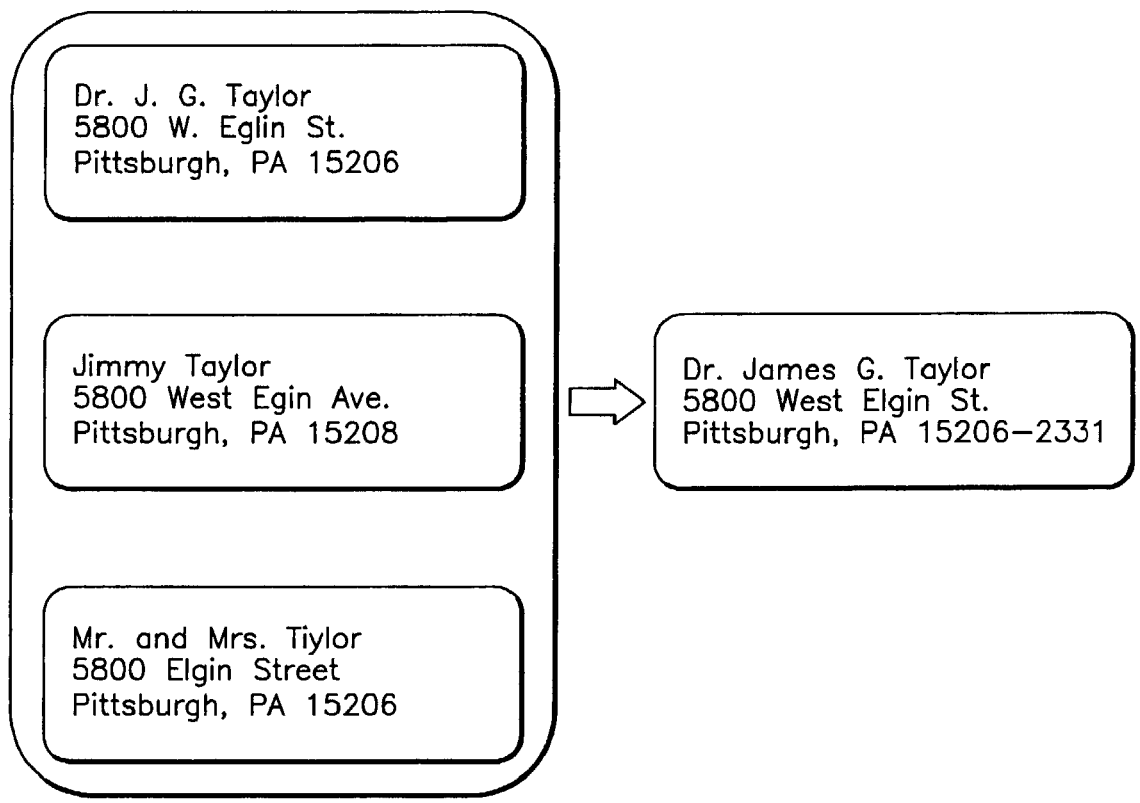
FIG. 7 is a schematic representation of yet another example part of a system for use with the present invention.

Typically, an example data cleansing process may be broken down into the following steps: parsing (FIG. 2); validation/correction (FIG. 3); standardization (FIG. 4); clustering (FIG. 5); matching (FIG. 6); and merging (FIG. 7). Note that different approaches may consolidate these steps or add additional ones, but the example system is essentially the same.

As viewed in FIG. 2, parsing may intelligently break a text string into the correct data fields. Typically, the data is not found in an easily readable format and a significant amount of decoding needs to be done to determine which piece of text corresponds to what particular data field. Note that this step does not involve error correction.

Records may be formatted or free-form. Formatted records have field values stored in a fixed order, and properly delineated. Free-form records have field values stored in any order, and it may be unclear where one field ends and another begins.

Once the string is parsed into the appropriate fields, the validation step, as viewed in FIG. 3, may check the field values for proper range and/or validity. Thus, a "truth" criteria must be provided as input to this step for each field.

The correction step may update the existing field value to reflect a specific truth value (i.e., correcting the spelling of "Pittsburgh" in FIG. 3). The correction step may use a recognized source of correct data such as a dictionary or a table of known correct values. For certain data, this step might not be feasible or appropriate and may be skipped.

As viewed in FIG. 4, the standardization step may arrange the data in a consistent manner and/or a preferred format in order for it to be compared against data from other sources. The preferred format for the data should be provided as input to this step.

Figure 5:
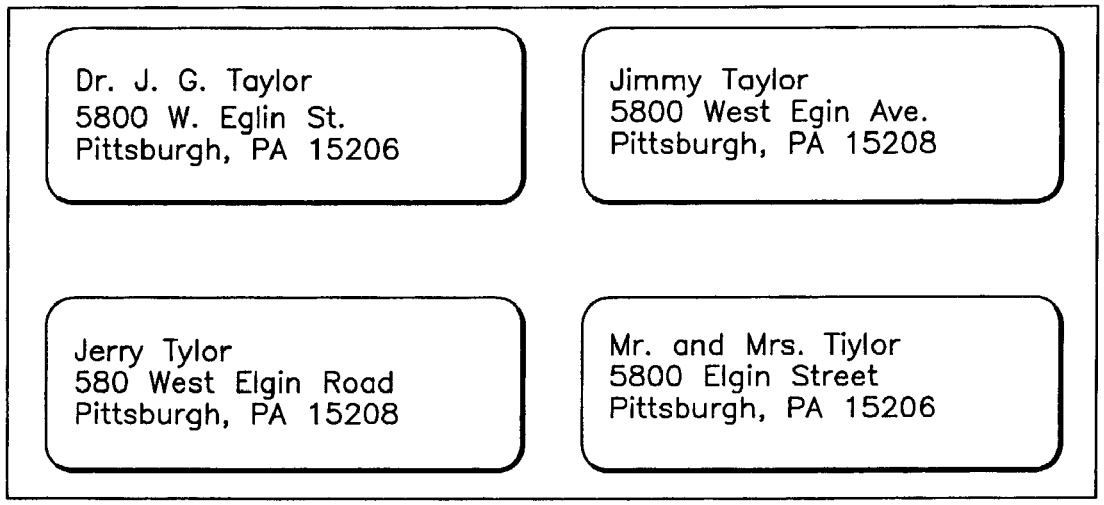
FIG. 5 is a schematic representation of yet another example part of a system for use with the present invention.

As viewed in FIG. 5, the clustering step may create groups of records likely to represent the same entity. Each group of records is termed a cluster. If constructed properly, each cluster contains all records in a database actually corresponding to a unique entity. A cluster may also contain some other records that correspond to other entities, but are similar enough to be considered. Preferably, the number of records in the cluster is very close to the number of records that actually correspond to the entity for which the cluster was built.

As viewed in FIG. 6, the matching step may identify the records in each cluster that actually refer to the same entity. The matching step searches the clusters with an application specific set of rules and utilizes a computational intensive search algorithm to match elements in a cluster to the unique entity. For example, the three indicated records in FIG. 6 likely correspond to the same person or entity, while the fourth record may be considered to have too many differences and likely represents a second person or entity.

As viewed in FIG. 7, the merging step may utilize information generated from the clustering and matching steps to combine multiple records into a unique (and preferably the most correct) view of each entity. The merging step may take data from fields of different records and "fuse" them into one, thereby providing the most accurate information available about the particular entity. The intelligent merging of several records into a single consolidated record ideally creates a new record that could replace the duplicate record cluster it was generated from without loss of any information.

In the clustering and matching steps, algorithms identify and remove duplicate or "garbage" records from the collection of records. Determining if two records are duplicates involves performing a similarity test that quantifies the similarity (i.e., a calculation of a similarity score) of two records. If the similarity score is greater than a certain threshold value, the records are considered duplicates.

Most data cleansing approaches limit the number of these "more intensive" comparisons to only the "most promising" record pairs, or pairs having the highest chance of producing a match. The reasoning is that "more intensive" comparisons of this type are generally very computationally expensive to perform. Many record pairs have no chance of being considered similar if compared (since the records may be very different in every field), thus the expensive comparison step was "wasted" if we simply compare every pair of records. The trade-off for not performing the "more intensive" inspection for every record pair is that some matches may be missed. Record pairs cannot have high enough similarity scores if the similarity score is never calculated.

For an example description of a system for use with the present invention, assume the record data is given, including format of the data and type of data expected to be seen in each record field. The format and type information describes the way the record data is conceptually modeled.

Each record contains information about a real-world entity. Each record can be divided into fields, each field describing an attribute of the entity. The format of each record includes information about the number of fields in the record and the order of the fields. The format also defines the type of data in each field (for example, whether the field contains a string, a number, date, etc.).

The clustering step may produce a set of records "possibly" describing the same real-world entity. This set ideally includes all records actually describing that entity and records that "appear to" describe the same entity, but on closer examination may not. This step is similar to a human expert identifying similar records with a quick pass through the data (i.e.; a quick pass step).

The matching step may produce duplicate records, which are defined as records in the database actually describing the same real-world entity. This step is similar to a human expert identifying similar records with a careful pass through the data (i.e., a careful pass step).

The concepts of correctness using the terms "possibly describing" and "actually describing" refer to what a human expert would find if she/he examined the records. An example system for use with the present invention is an improvement in both accuracy and efficiency over a human operator.

If constructed properly, each cluster contains all records in a database actually corresponding to the single real-world entity as well as additional records that would not be considered duplicates, as identified by a human expert. These clusters are further processed to the final duplicate record list during the matching step. The clustering step preferably makes few assumptions about the success of the parsing, verification/correction, and standardization steps, but performs better if these steps have been conducted accurately. In the clustering step, it is initially assumed that each record potentially refers to a distinct real-world entity, so a cluster is built for each record.

Figure 8:
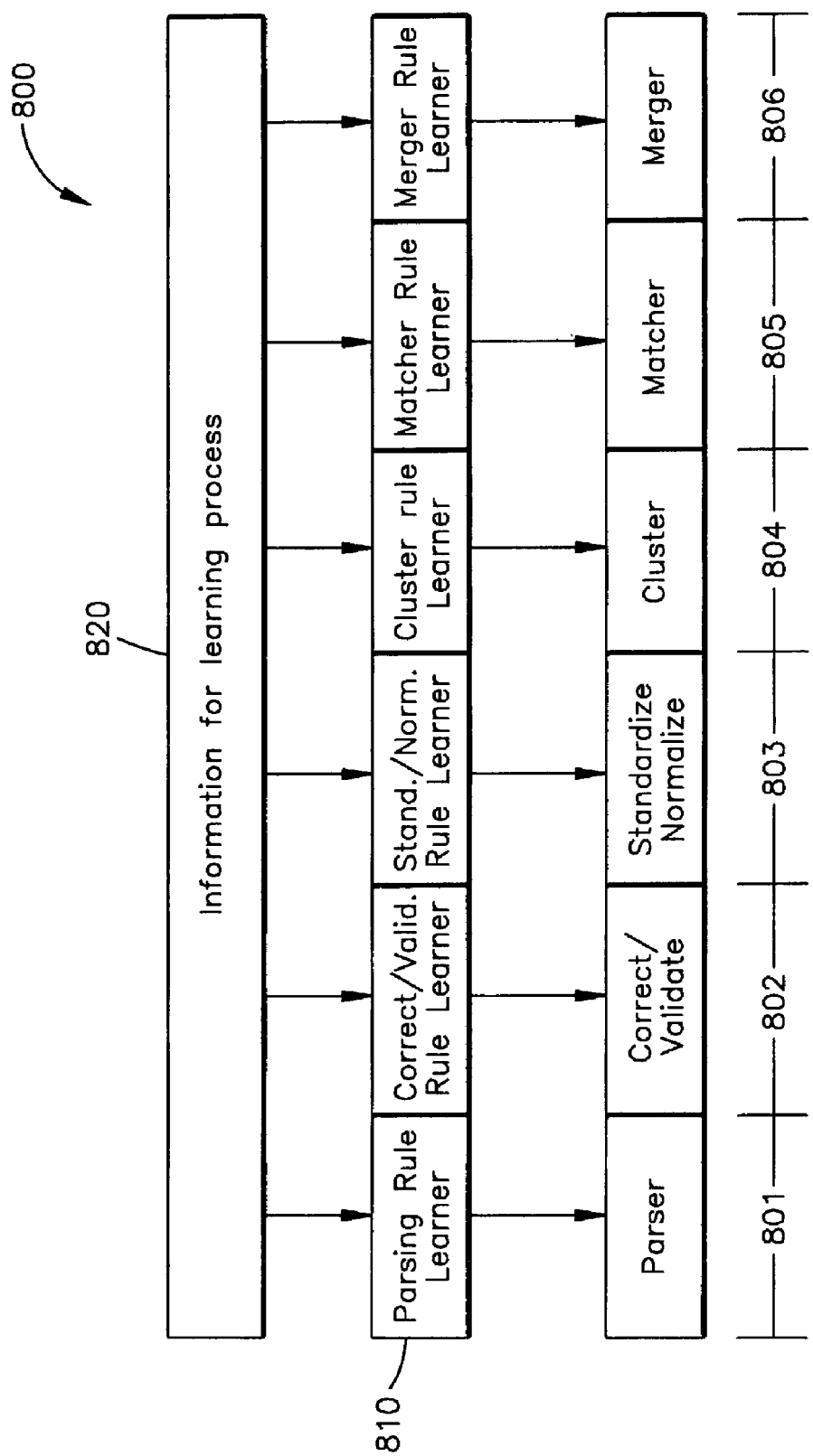
FIG. 8 is a schematic representation of part of an example system in accordance with the present invention.

As illustrated in FIG. 8, a data cleansing application 800 is conventionally regarded as a "black box." Data is input to the cleansing application 800 and results come back after some processing, but "how" the results were generated is hidden from the user. Thus, the user may not easily determine what parameters of the cleansing application 800 should be changed (or how to change them) to improve the results.

The results from the example data cleansing application 800 may be large, especially when a user is cleansing large data sets. Preferably, a large amount of information is presented to users in a predefined, easily understandable format, while taking into account that only a small portion of the results may be interesting to the user. Additionally, what is considered interesting is user-specific, and the system should allow user customization of this aspect.

The visualization system 900 in accordance with the present invention provides a human expert with the ability to enter domain-specific information about the data to a learning system 810 that may accompany a cleansing application 800. This information may suggest improvements to the cleansing application 800. To be most effective, the learning system 810 has an interface 820 that provides feedback about what the system is actually learning and allows the user to enter relevant information and edit what the system has learned, as needed.

Figure 9:
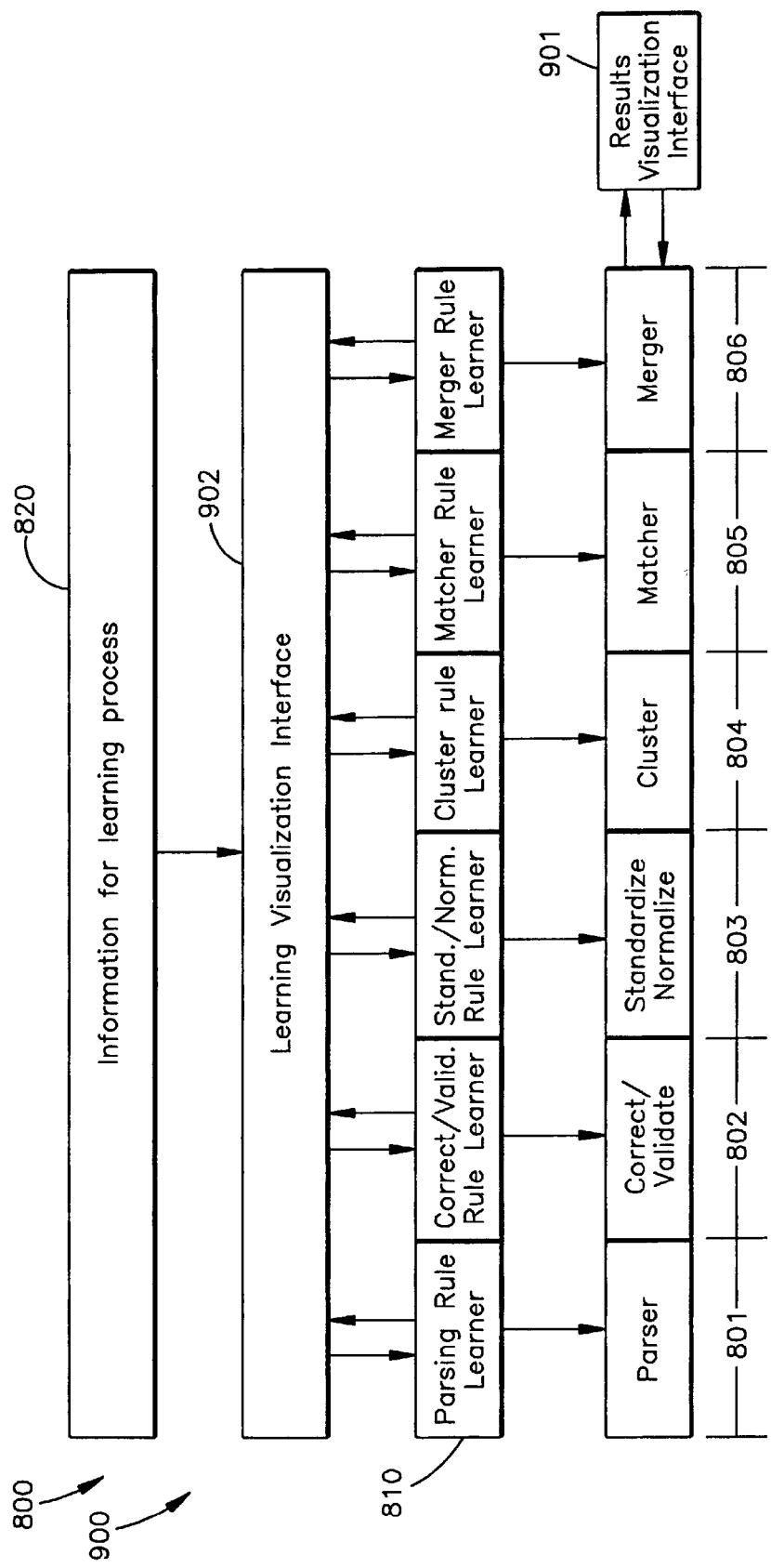
FIG. 9 is a schematic representation of another part of an example system in accordance with the present invention.

As illustrated in FIG. 9, an example visualization system 900 in accordance with the present invention includes a results visualization (RV) module 901 and one or more learning visualization interface (LVI) modules 902. The RV module 901 organizes the output of the example cleansing application 800 into a predefined, graphical format for presentation to a human user. Additional results from intermediate steps in the cleansing application 800 may be displayed as well. The RV module 901 allows a human user to examine in detail portions of the result considered "interesting." The RV module 901 also supports user editing of the results.

The LVI modules 902 facilitate user interaction with the learning system components of the cleansing application 800. The LVI modules 902 allow a human expert to enter information into the learning module 810 and provide feedback on the operation of the LVI modules. The LVI modules 902 also provide intelligent graphical representation of the modules' operation.

FIG. 9 illustrates how these pieces would fit into the example data cleansing application 800. The RV module 901 displays the results of the cleansing application 800 in a predefined, graphical form for visualization by a human user. The inputs to this module 901 would be the results of the cleansing application 800 output by the merging step (i.e., the set of composite, merged records). The display has multiple levels, allowing the user to "drill-down" to closely examine "interesting", or anomalous, results. The user may expand an element in a higher level of the display to see additional information about that element.

Figure 10:
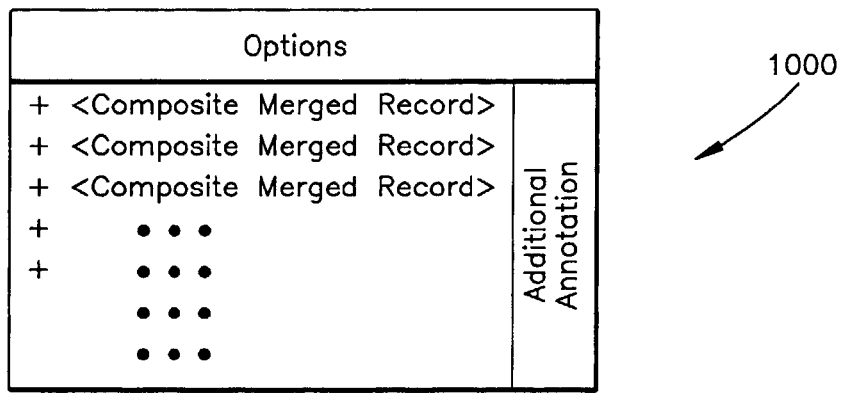
FIG. 10 is a schematic representation of still another part of an example system in accordance with the present invention.

As illustrated in FIG. 10, a top level 1000 of the display may be a list of records in the cleansed result, along with annotations about which of these results may be "interesting" to a user. A user may expand one of these records to view the list of original records from which this composite record was generated.

Figure 11:
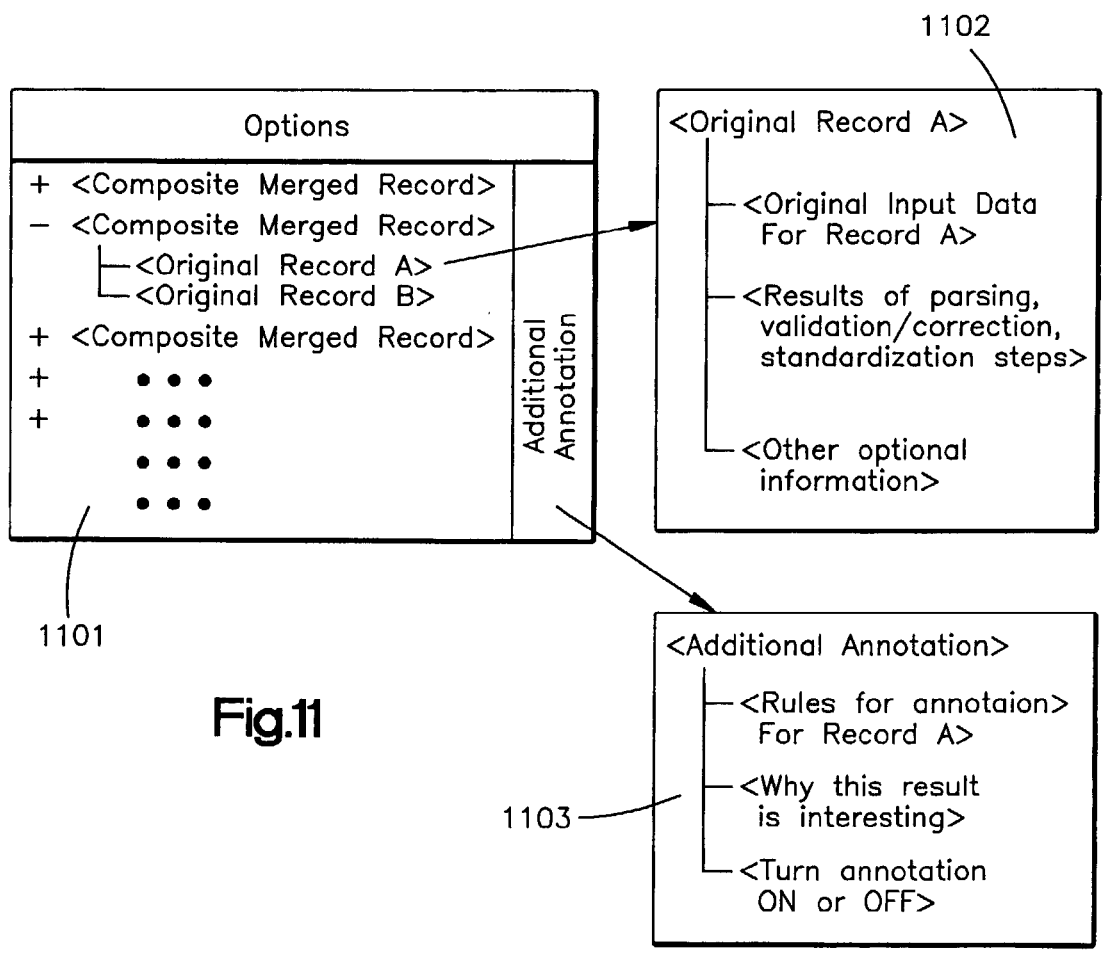
FIG. 11 is a schematic representation of yet another part of an example system in accordance with the present invention.

The expanded record 1101 is shown in the upper-left box of FIG. 11. For each of the original records, the user may "drill down" further and expand information about the results from prior steps in the cleansing application 800. An example of this "drilling down" 1102 is shown in the upper right box of FIG. 11.

The user may also set the rules 1103 for what results receive annotation or not by expanding the annotation section, as shown in the lower right box of FIG. 11. The annotation rules may define the results the user might be interested in, and candidates for further analysis. The rules may be set by the cleansing application, the user, or a combination of both.

An example parsing/correction/standardization LVI module 1200 may serve as the interface to the learning components for the parsing, correction, and standardization steps. Through this module 1200, a user may review how the original record source data was parsed (i.e., broken apart into data field components). A user may also review how each field value was corrected and standardized (i.e., validated to see if the value is in proper range and then put into an accepted form for further comparisons) by the cleansing application 800. The user may also receive an explanation of how the results for these steps were generated and the assumptions the application 800 utilized to generate them.

Figure 12:
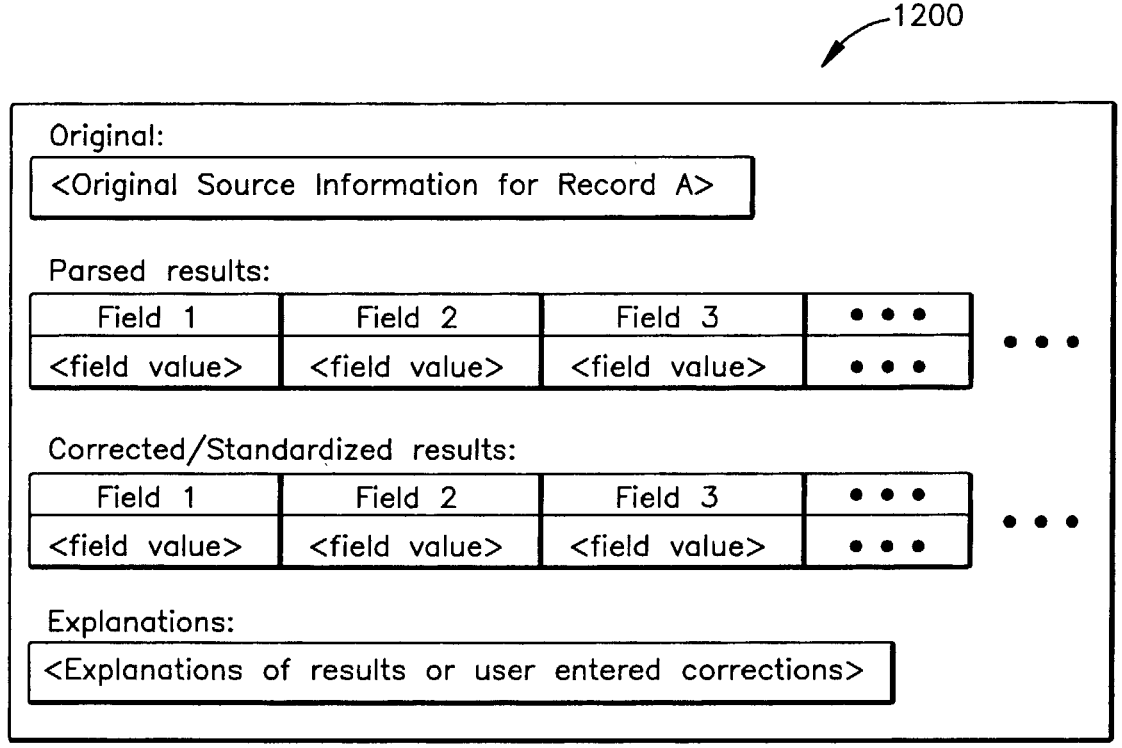
FIG. 12 is a schematic representation of still another part of an example system in accordance with the present invention.

If necessary, a user may edit the results and annotate an explanation for the mistake. The edited results and explanation may be feedback to the learning system 810. FIG. 12 illustrates a display of an example parsing/standardization/visualization LVI module 1200.

Figure 13:
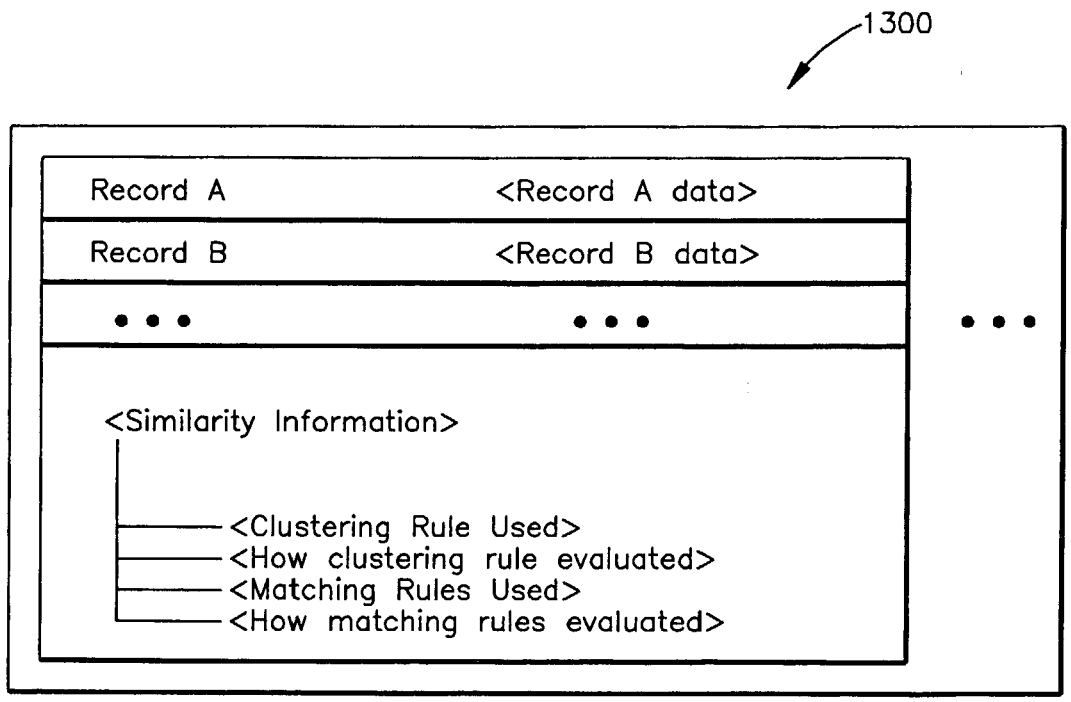
FIG. 13 is a schematic representation of yet another part of an example system in accordance with the present invention.

An example clustering and matching LVI module 1300 may serve as the interface to the learning components for the clustering and matching steps. The clustering step determines which sets of records that may refer to the same object. The matching step identifies records in a cluster that actually refer to the same entity. FIG. 13 illustrates a display of an example clustering/matching LVI module 1300.

All of the records in a particular cluster are displayed. The cluster that is chosen may be a cluster that the cleansing application had trouble processing. Given the business rules and algorithmic thresholds the cleansing application has been given, there may be some ambiguity as to how these records should be processed. Additional user feedback to resolve this ambiguity might be useful. Also included in the display are the rules and functions used for the clustering and matching steps, and how these were carried out for the records in question.

The display for the clustering/matching steps may also highlight records that actually refer to the same object within the cluster and an explanation for how the application 800 generated the cluster and/or the matching results. The user may edit the matching results and provide an annotation explaining the change. Any editing may be given as feedback to the learning system 810 associated with the clustering and matching steps.

Figure 14:
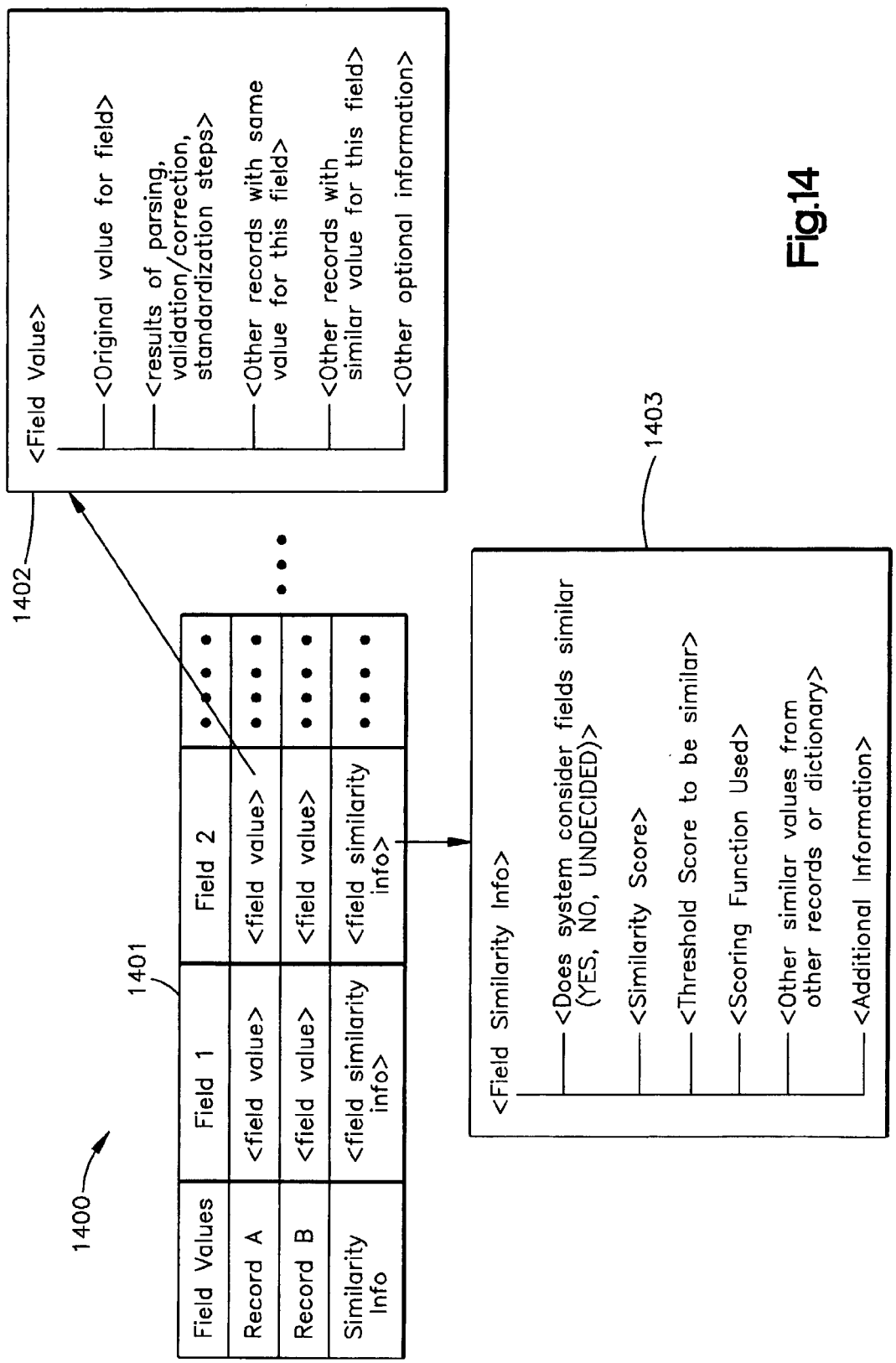
FIG. 14 is a schematic representation of still another part of an example system in accordance with the present invention.

An example field similarity LVI module 1400 may serve as an interface for a human user to examine and edit similarity information for the different record data fields. An example functional diagram of the interface is illustrated in FIG. 14. The top level 1401, shown in the upper left box FIG. 14, displays two records for which the cleansing application 800 is undecided and may consider a "borderline match." The two records may refer to the same entity, but the cleansing application 800 does not have enough information to confidently make the determination. These "borderline matches" will be brought to the user's attention and resolved using this interface.

The user may expand the field value (shown in the upper right box of FIG. 14, for one of the records to see additional information about how it was generated 1402. Additional information includes the results of earlier steps in the application 800 and a listing of other records with the same or similar values for the field.

As illustrated in the lower left box of FIG. 14, the user may more closely examine similarity information for any of the record fields that is considered "interesting" 1403. The similarity function provides a score that measures how similar two field values are. If the score is above a threshold value, then the two values are considered identical with any difference being a slight variation to be ignored.

The user may edit any of this information as appropriate and recalculate the similarity results based on the new information. Any editing by the user may be given as feedback to the associated learning system 810 for improving the matching process. This may include the like refining of the functions that measure similarity between field values, thus setting better threshold scores for similarity. Feedback from this interface may be used to build or extend a data dictionary of acceptable, correct values for each record field as well.

From the above description of the invention, those skilled in the art will perceive improvements, changes and modifications. Such improvements, changes and modifications within the skill of the art are intended to be covered by the appended claims.

Having described the invention, the following is claimed:

1. A system for viewing results of a data cleansing application, said system comprising:
    a results visualization module for organizing output of intermediate steps of the data cleansing application into a predefined format including outputs from a group consisting of a parsing step, a correction step, a standardization step, a matching step, a clustering step, and a merging step, said results visualization module displaying the outputs to a user; and
    a learning visualization interface module for facilitating interaction with steps of the data cleansing application consisting of the group of the parsing step, the correction step, the standardization step, the matching step, the clustering step, and the merging step by the user.

2. The system as set forth in claim 1 wherein said results visualization module allows editing of the results from the group consisting of the parsing step, the correction step, the standardization step, the matching step, the clustering step, and the merging step of the data cleansing application by the user.

3. The system as set forth in claim 1 wherein said learning visualization interface module allows the user to enter information into the group consisting of the parsing step, the correction step, the standardization step, the matching step, the clustering step, and the merging step of the data cleansing application in order to provide feedback to said learning visualization interface module.

4. The system as set forth in claim 1 wherein said results visualization module allows a user to expand an element of the results in order to display more specific data regarding the element.

5. The system as set forth in claim 1 wherein said results visualization module displays a top level of results, said top level including a list of records cleansed by the data cleansing application and information determining which of the records in the list of records is anomalous.

6. The system as set forth in claim 1 wherein said learning visualization interface module is a field similarity learning visualization interface module for reviewing results of similarity information for different record fields of the data cleansing application and feeding back information in order to optimize the identification of similar fields.

7. A method for viewing results of a data cleansing application, said method comprising the steps of:
    organizing output of intermediate steps of the data cleansing application into a predefined format including outputs from a group consisting of a parsing step, a correction step, a standardization step, a matching step, a clustering step, and a merging step;
    displaying the output to a user; and
    providing interaction with the steps of the data cleansing application consisting of the group of the parsing step, the correction step, the standardization step, the matching step, the clustering step, and the merging step by the user.

8. The method as set forth in claim 7 further comprising the step of editing the results from the group consisting of the parsing step, the correction step, the standardization step, the matching step, the clustering step, and the merging step of the data cleansing application by the user.

9. The method as set forth in claim 7 further comprising the step of entering information into the group consisting of the parsing step, the correction step, the standardization step, the matching step, the clustering step, and the merging step of the data cleansing application by the user in order to provide feedback.

10. The method as set forth in claim 7 further comprising the step of expanding an element of the results in order to display more specific data regarding the element.

11. The method as set forth in claim 7 further comprising the step of displaying a top level of results, the top level including a list of records cleansed by the data cleansing application and information determining which of the records in the list of records is anomalous.

12. The method as set forth in claim 7 further comprising the step of reviewing results of similarity information for different record fields of the data cleansing application and feeding back information in order to optimize the identification of similar fields.

* * * * *